(12) United States Patent
Ljung et al.

(10) Patent No.: US 8,909,308 B2
(45) Date of Patent: Dec. 9, 2014

(54) ANTENNA SWAPPING METHODS USING A TIME PERIOD THAT IS RECEIVED FROM A NETWORK, AND RELATED WIRELESS ELECTRONIC DEVICES

(75) Inventors: Rickard Ljung, Helsingborg (SE); Erik Bengtsson, Lund (SE); Thomas Bolin, Lund (SE); Peter Karlsson, Lund (SE); Zhinong Ying, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 161 days.

(21) Appl. No.: 13/535,738

(22) Filed: Jun. 28, 2012

(65) Prior Publication Data

US 2014/0004802 A1 Jan. 2, 2014

(51) Int. Cl.
*H04M 1/00* (2006.01)

(52) U.S. Cl.
USPC .................. 455/575.7; 455/134; 343/876

(58) Field of Classification Search
USPC ........ 455/575.7, 230, 352, 136, 562.1, 550.1, 455/134; 343/876
See application file for complete search history.

(56) References Cited

U.S. PATENT DOCUMENTS

| | | | | |
|---|---|---|---|---|
| 6,317,424 | B1 * | 11/2001 | Euscher | 370/350 |
| 6,560,443 | B1 * | 5/2003 | Vaisanen et al. | 455/73 |
| 8,391,190 | B2 * | 3/2013 | Pan et al. | 370/280 |
| 2007/0232309 | A1 | 10/2007 | Koszarsky | |
| 2010/0069028 | A1 * | 3/2010 | Choi et al. | 455/136 |
| 2012/0057535 | A1 * | 3/2012 | Zhang et al. | 370/329 |

FOREIGN PATENT DOCUMENTS

EP 1458120 A2 9/2004

OTHER PUBLICATIONS

3GPP TR 25.863, V10.0.0 (Jul. 2010), $3^{rd}$ Generation Partnership Project; Technical Specification Group Radio Access Network; Universal Terrestrial Radio Access (UTRA); Uplink transmit diversity for High Speed Packet Access (HSPA)(Release 10), 212 Pages.

3GPP TS 25.331, V1.5.0 (Sep. 1999), $3^{rd}$ Generation Partnership Project (3GPP); Technical Specification Group (TSG) RAN; Working Group 2 (WG2); RRC Protocol Specification, TSG-RAN meeting #5, Oct. 6-8, 1999, Kyongju, Sweden, 218 Pages.

3GPP TS 36.331, V10.5.0 (Mar. 2012), $3^{rd}$ Generation Partnership Project; Technical Specification Group Radio Access Network; Evolved Universal Terrestrial Radio Access (E-UTRA; Radio Resource Control (RRC); Protocol specification (Release 10), 302 Pages.

International Search Report and Written Opinion Corresponding to International Application No. PCT/IB2013/001040; Date of Mailing: Sep. 2, 2013; 13 Pages.

* cited by examiner

*Primary Examiner* — Sonny Trinh
(74) *Attorney, Agent, or Firm* — Myers Bigel Sibley & Sajovec, PA

(57) ABSTRACT

Antenna swapping methods for a wireless electronic device may include refraining from swapping antennas of the wireless electronic device for wireless communication with a network other than during a time period that is received at the wireless electronic device from the network. Related systems and devices are also described.

18 Claims, 12 Drawing Sheets

ANTENNA SWAPPING METHODS USING A TIME PERIOD THAT IS RECEIVED FROM A NETWORK, AND RELATED WIRELESS ELECTRONIC DEVICES

FIELD

The present inventive concepts generally relate to the field of communications and, more particularly, to antennas and wireless electronic devices incorporating the same.

BACKGROUND

Wireless electronic devices may include a plurality of antennas and a plurality of transmission chains. In particular, some wireless electronic devices may include a greater number of antennas than transmission chains. Accordingly, a given wireless electronic device may swap from using one group of antennas with its transmission chains to using a different group of antennas. For example, the antennas may be swapped to change radio channel properties between the given wireless electronic device and a base station.

Antenna swapping may be performed at the given wireless electronic device without receiving signaling related to the antenna swapping from a network (e.g., a network that includes the base station). Such antenna swapping without network involvement may be referred to as "open loop antenna selection diversity," and is described in 3rd Generation Partnership Project (3GPP) technical report TR 25.863.

SUMMARY

Various embodiments of the present inventive concepts include antenna swapping methods for a wireless electronic device. The antenna swapping methods may include receiving a measurement control message indicating measurement gap timing from a network at the wireless electronic device over a first antenna configuration. The antenna swapping methods may also include swapping from the first antenna configuration to a second antenna configuration, and measuring a performance characteristic of the second antenna configuration, at the indicated measurement gap timing. The antenna swapping methods may additionally include comparing the performance characteristic of the second antenna configuration with a performance characteristic of the first antenna configuration. The antenna swapping methods may further include transmitting an event signal from the wireless electronic device to the network in response to determining that the performance characteristic of the second antenna configuration exceeds the performance characteristic of the first antenna configuration. The antenna swapping methods may also include, after transmitting the event signal, receiving a swap command from the network at the wireless electronic device indicating a time period for the wireless electronic device to swap from the first antenna configuration to the second antenna configuration. The antenna swapping methods may additionally include swapping from the first antenna configuration to the second antenna configuration, at the indicated time period, and communicating with the network over the second antenna configuration.

In various embodiments, the swapping at the indicated measurement gap timing may include a swap for antenna evaluation purposes that is more temporary than the swapping at the indicated time period.

According to various embodiments, the antenna swapping methods may further include, after either swapping from the first antenna configuration to the second antenna configuration at the indicated time period or determining that the performance characteristic of the second antenna configuration does not exceed the performance characteristic of the first antenna configuration, determining whether a new measurement control message indicating new measurement gap timing has been received from the network at the wireless electronic device.

In various embodiments, the antenna swapping methods may further include, in response to determining that the new measurement control message has been received, swapping between the first and second antenna configurations, and measuring the performance characteristic of one of the first and second antenna configurations, at the new indicated measurement gap timing.

According to various embodiments, the antenna swapping methods may further include, in response to determining that the new measurement control message has not been received, swapping between the first and second antenna configurations, and measuring the performance characteristic of one of the first and second antenna configurations, at the measurement gap timing indicated by the previously-received measurement control message.

In various embodiments, the indicated measurement gap timing may indicate one or more time slots during which the network will not expect the wireless electronic device to receive and process transmissions from the network.

According to various embodiments, comparing the performance characteristics of the first and second antenna configurations, respectively, includes comparing a signal quality measurement of the first antenna configuration with a signal quality measurement of the second antenna configuration.

In various embodiments, swapping from the first antenna configuration to the second antenna configuration includes swapping from a first group of antennas to a second group of antennas. Additionally, the number of active antennas among all groups of antennas may remain constant before and after the swapping.

According to various embodiments, the indicated time period may include a frame of time defined by a scheduler of the network.

In various embodiments, the antenna swapping methods may further include disallowing closed-loop antenna swapping by discontinuing receipt of measurement control messages from the network at the wireless electronic device.

Antenna swapping methods for a wireless electronic device according to various embodiments may include refraining from swapping antennas of the wireless electronic device for wireless communication with a network other than during a time period that is received at the wireless electronic device from the network.

Wireless electronic devices according to various embodiments may include first and second antennas connected to a multi-band transceiver circuit configured to provide communications for the wireless electronic devices. An individual one of the wireless electronic devices may also include a controller. The controller may be configured to receive a measurement control message indicating measurement gap timing from a network. The controller may also be configured to control swapping from the first antenna to the second antenna by connecting the second antenna to a transmission chain of an individual one of the wireless electronic devices and disconnecting the first antenna from the transmission chain, and measure a performance characteristic of the second antenna, at the indicated measurement gap timing. The controller may additionally be configured to compare the performance characteristic of the second antenna with a performance characteristic of the first antenna. The controller may be further configured to transmit an event signal to the network indicating that the second antenna provides a better antenna configuration than the first antenna, in response to determining that the performance characteristic of the second antenna exceeds the performance characteristic of the first antenna. The controller may also be configured to, after transmitting the event signal, receive a swap command from the network indicating a time period to swap from the first antenna to the second antenna. The controller may additionally be configured to control swapping from the first antenna to the second antenna by connecting the second antenna to the transmission chain and disconnecting the first antenna from the transmission chain, at the indicated time period. The controller may be further configured to control communication between the second antenna and the network after the indicated time period.

According to various embodiments, the transmission chain may include one among a plurality of transmission chains of an individual one of the wireless electronic devices. Additionally, the first and second antennas may include first and second antennas among a plurality of antennas of an individual one of the wireless electronic devices. Moreover, an individual one of the wireless electronic devices may further include a switch that connects the plurality of transmission chains and the plurality of antennas. Furthermore, a quantity of the plurality of antennas may be greater than a quantity of the plurality of transmission chains.

In various embodiments, the controller may be configured to command the switch to switch which ones of the plurality of antennas are connected to ones of the plurality of transmission chains.

According to various embodiments, an individual one of the wireless electronic devices may include a non-transitory storage medium that stores an antenna swapping algorithm. Also, the controller may be configured to control input of the performance characteristics of the first and second antennas, respectively, into the antenna swapping algorithm. Moreover, the controller may be further configured to control transmission of an output of the antenna swapping algorithm to the network as the event signal, in response to the antenna swapping algorithm determining that the performance characteristic of the second antenna exceeds the performance characteristic of the first antenna.

In various embodiments, the controller may be further configured to determine whether a new measurement control message indicating new measurement gap timing has been received from the network at an individual one of the wireless electronic devices, after the antenna swapping algorithm either determines that the performance characteristic of the second antenna exceeds the performance characteristic of the first antenna or determines that the performance characteristic of the second antenna does not exceed the performance characteristic of the first antenna. Also, the swapping at the indicated measurement gap timing may include a swap for antenna evaluation purposes that is more temporary than the swapping at the indicated time period.

According to various embodiments, the controller may be further configured to control swapping between the first and second antennas, and measuring the performance characteristic one of the first and second antennas, at the new indicated measurement gap timing, in response to determining that the new measurement control message has been received.

In various embodiments, the controller may be further configured to control swapping between the first and second antennas, and measuring the performance characteristic of one of the first and second antennas, at the measurement gap timing indicated by the previously-received measurement control message, in response to determining that the new measurement control message has not been received.

According to various embodiments, the controller may be further configured to temporarily reduce transmission output power during the swapping at the indicated time period.

In various embodiments, swapping from the first antenna to the second antenna may include swapping from a first group of antennas to a second group of antennas.

Other devices and/or operations according to embodiments of the inventive concepts will be or become apparent to one with skill in the art upon review of the following drawings and detailed description. It is intended that all such additional devices and/or operations be included within this description, be within the scope of the present inventive concepts, and be protected by the accompanying claims. Moreover, it is intended that all embodiments disclosed herein can be implemented separately or combined in any way and/or combination.

DETAILED DESCRIPTION OF EMBODIMENTS

Figure 1:
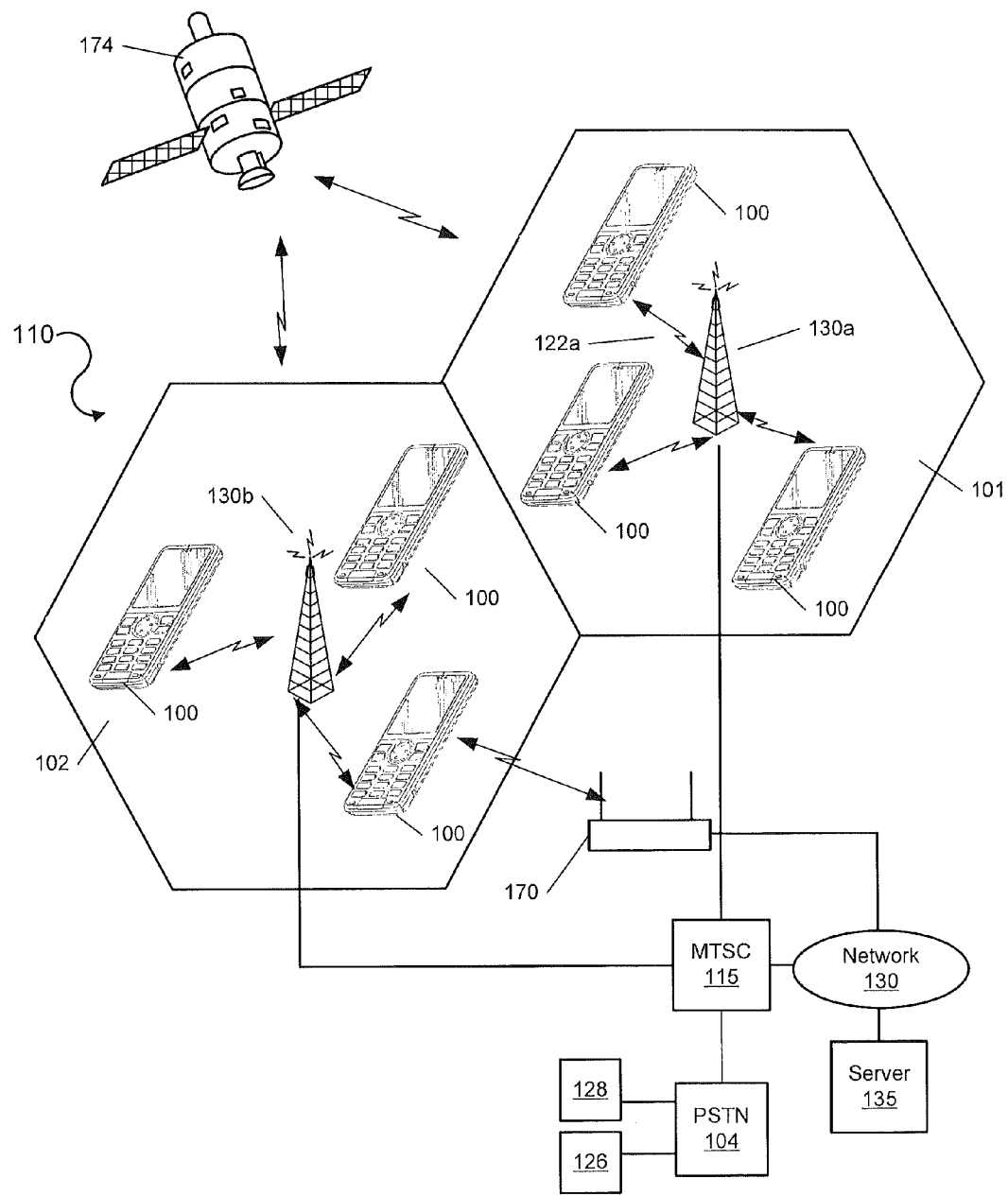
FIG. 1 is a schematic illustration of a wireless communications network that provides service to wireless electronic devices, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein the term "and/or" includes any and all combinations of one or more of the associated listed items.

Spatially relative terms, such as "above", "below", "upper", "lower" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It, will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is to be understood that the functions/acts indicated in the illustrated blocks may occur out of the order noted in the operational illustrations. For example, two blocks shown in succession may in fact be executed substantially concurrently or the blocks may sometimes be executed in the reverse order, depending upon the functionality/acts involved.

For purposes of illustration and explanation only, various embodiments of the present inventive concepts are described herein in the context of "wireless electronic devices." Among other devices/systems, wireless electronic devices may include multi-band wireless communication terminals (e.g., portable electronic devices/wireless terminals/mobile terminals/terminals) that are configured to carry out cellular communications (e.g., cellular voice and/or data communications) in more than one frequency band. It will be understood, however, that the present inventive concepts are not limited to such embodiments and may be embodied generally in any device and/or system that is configured to transmit and receive in two or more frequency bands.

Although some wireless electronic devices have used open loop antenna swapping techniques, a result of open loop antenna swapping techniques may be that a network (e.g., a base station in a network) is not informed in advance that a radio channel change is about to occur. Accordingly, if a given wireless electronic device changes transmit antennas during an ongoing data transmission to the base station, the base station may experience a disruptive change in the properties of a radio channel. Moreover, antenna swapping during an ongoing transmission may harm an antenna switch of the given wireless electronic device, because the antenna switch may not be configured to handle swapping while a high power signal is transferred through the switch.

Various embodiments of the operations and related wireless electronic devices described herein, however, may use closed loop antenna swapping techniques that explicitly signal an antenna swapping time period from the network to the given wireless electronic device. It will be understood that the terms "swap" and "swapping," as used herein, may include switching, changing, or selecting between different antennas. Additionally, the network may explicitly signal to the given wireless electronic device timing for performing antenna measurements. In other words, the network can tell the wireless electronic device when it is possible to perform measurements for a possible better antenna configuration. Accordingly, the given wireless electronic device may evaluate different antenna configurations for its transmission chains and swap between these different antenna configurations based on network-controlled timing.

In particular, various embodiments of the operations and related wireless electronic devices described herein, may involve modifications to existing 3GPP standards. For example, event triggering and corresponding measurement procedure control messages are described in Radio Resource Control (RRC) signaling specifications 3GPP TS 25.331 (for Wideband Code Division Multiple Access (WCDMA)) and 3GPP TS 36.331 (for Long Term Evolution (LTE)). In particular, the RRC signaling specifications may be modified to add measurement control signaling that allows a wireless electronic device to perform antenna swapping measurements. Additionally, a timing event could be added that triggers the wireless electronic device to signal an antenna swapping measurement report (e.g., a report of the results of antenna measurements). Furthermore, base station signaling could be added for granting antenna swapping to the wireless electronic device. Moreover, signaling specifications could be modified for Time Division Multiple Access (TDMA), among other communications methods, to incorporate network-controlled timing for antenna swapping.

Accordingly, in contrast with open loop antenna swapping, various embodiments of closed loop antenna swapping described herein may allow the base station to be informed in advance about a disruptive swapping-caused change in channel properties between the given wireless electronic device and the base station. Additionally, the wireless electronic device may temporarily reduce its transmission output power during the antenna swapping to reduce damage to the antenna switch.

Referring to FIG. 1, a diagram is provided of a wireless communications network 110 that supports communications in which wireless electronic devices 100 can be used according to various embodiments of the present inventive concepts. The network 110 includes cells 101, 102 and base stations 130a, 130b in the respective cells 101, 102. Networks 110 are commonly employed to provide voice and data communications to subscribers using various radio access standards/technologies. The network 110 may include wireless electronic devices 100 that may communicate with the base stations 130a, 130b. The wireless electronic devices 100 in the network 110 may also communicate with a Global Positioning System (GPS) 174, a local wireless network 170, a Mobile Telephone Switching Center (MTSC) 115, and/or a Public Service Telephone Network (PSTN) 104 (i.e., a "landline" network).

The wireless electronic devices 100 can communicate with each other via the Mobile Telephone Switching Center (MTSC) 115. The wireless electronic devices 100 can also communicate with other devices/terminals, such as terminals 126, 128, via the PSTN 104 that is coupled to the network 110. As also shown in FIG. 1, the MTSC 115 is coupled to a computer server 135 via a network 130, such as the Internet.

The network 110 is organized as cells 101, 102 that collectively can provide service to a broader geographic region. In particular, each of the cells 101, 102 can provide service to associated sub-regions (e.g., the hexagonal areas illustrated by the cells 101, 102 in FIG. 1) included in the broader geographic region covered by the network 110. More or fewer cells can be included in the network 110, and the coverage area for the cells 101, 102 may overlap. The shape of the coverage area for each of the cells 101, 102 may be different from one cell to another and is not limited to the hexagonal shapes illustrated in FIG. 1. Each of the cells 101, 102 may include an associated base station 130a, 130b. The base stations 130a, 130b can provide wireless communications between each other and the wireless electronic devices 100 in the associated geographic region covered by the network 110.

Each of the base stations 130a, 130b can transmit/receive data to/from the wireless electronic devices 100 over an associated control channel. For example, the base station 130a in cell 101 can communicate with one of the wireless electronic devices 100 in cell 101 over the control channel 122a. The control channel 122a can be used, for example, to page the wireless electronic device 100 in response to calls directed thereto or to transmit traffic channel assignments to the wireless electronic device 100 over which a call associated therewith is to be conducted.

The wireless electronic devices 100 may also be capable of receiving messages from the network 110 over the respective control channel 122a. In various embodiments according to the inventive concepts, the wireless electronic devices 100 receive Short Message Service (SMS), Enhanced Message Service (EMS), Multimedia Message Service (MMS), and/or Smartmessaging™ formatted messages.

The GPS 174 can provide GPS information to the geographic region including cells 101, 102 so that the wireless electronic devices 100 may determine location information. The network 110 may also provide network location information as the basis for the location information applied by the wireless electronic devices 100. In addition, the location information may be provided directly to the server 135 rather than to the wireless electronic devices 100 and then to the server 135. Additionally or alternatively, the wireless electronic devices 100 may communicate with the local wireless network 170.

Figure 2A:
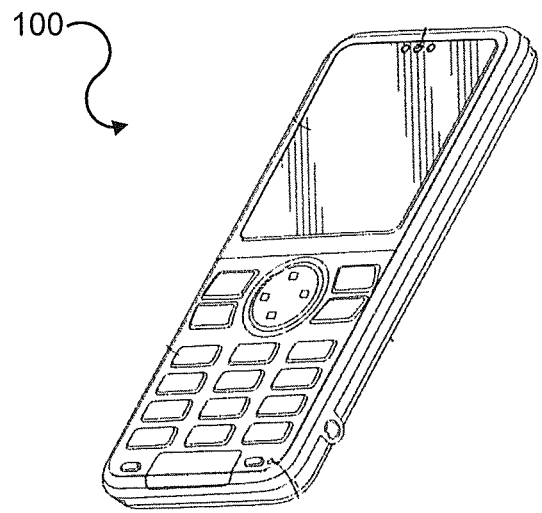
FIGS. 2A and 2B illustrate front and rear views, respectively, of a wireless electronic device, according to various embodiments of the present inventive concepts.
Figure 2B:
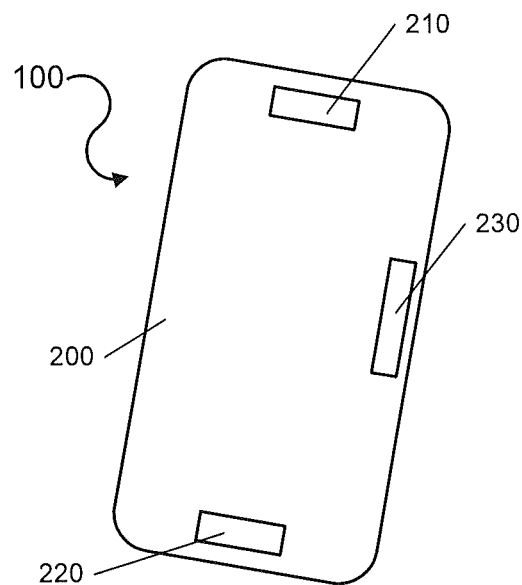

FIGS. 2A and 2B illustrate front and rear views, respectively, of a wireless electronic device 100, according to various embodiments of the present inventive concepts. Accordingly, FIGS. 2A and 2B illustrate opposite sides of the wireless electronic device 100. In particular, FIG. 2B illustrates an external face 200 of a backplate of the wireless electronic device 100. Accordingly, the external face 200 of the backplate may be visible to, and/or in contact with, the user of the wireless electronic device 100. In contrast, an internal face of the backplate may face internal portions of the wireless electronic device 100, such as a transceiver circuit.

FIG. 2B further illustrates a first antenna 210 on one end of the wireless electronic device 100, a second antenna 220 on another end of the wireless electronic device 100, and a third antenna 230 on a side of the wireless electronic device 100. It will be understood, however, that the wireless electronic device 100 may include more than three antennas, and/or that the antennas 210, 220, 230 may be arranged at various locations of the wireless electronic device 100. The antennas 210, 220, 230 may be antennas configured for wireless communications. For example, at least one of the antennas 210, 220, 230 may be a monopole antenna or a planar inverted-F antenna (PIFA), among others. Additionally, at least one of the antennas 210, 220, 230 may be a multi-band antenna and/or may be configured to communicate cellular and/or non-cellular frequencies. Moreover, according to various embodiments, each of the antennas 210, 220, 230 may be designed to cover all frequency bands of interest to the wireless electronic device 100, and each may be configured to transmit at full power and/or reduced power levels.

Figure 3A:
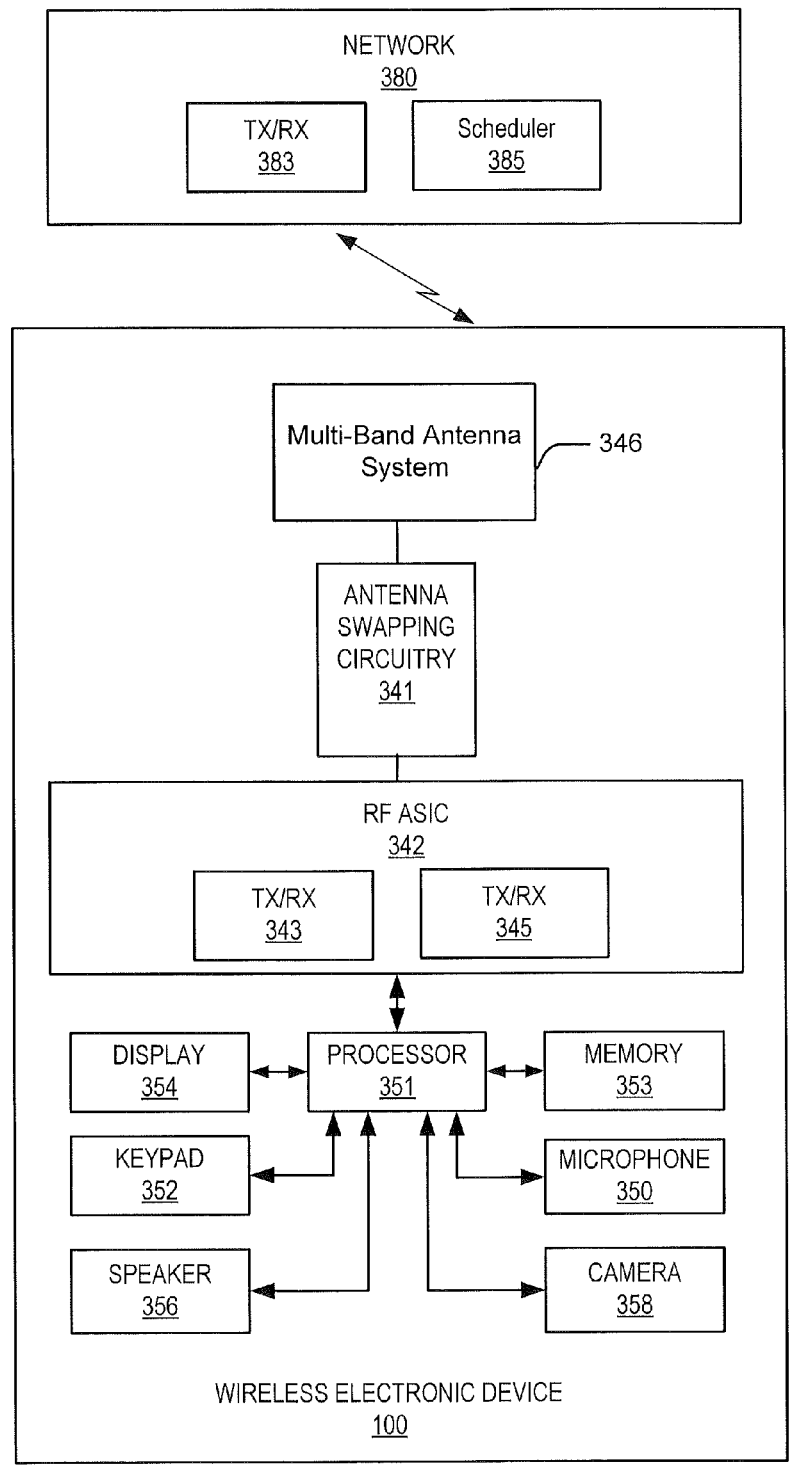
FIGS. 3A and 3B are block diagrams illustrating a wireless electronic device, according to various embodiments of the present inventive concepts.
Figure 3B:
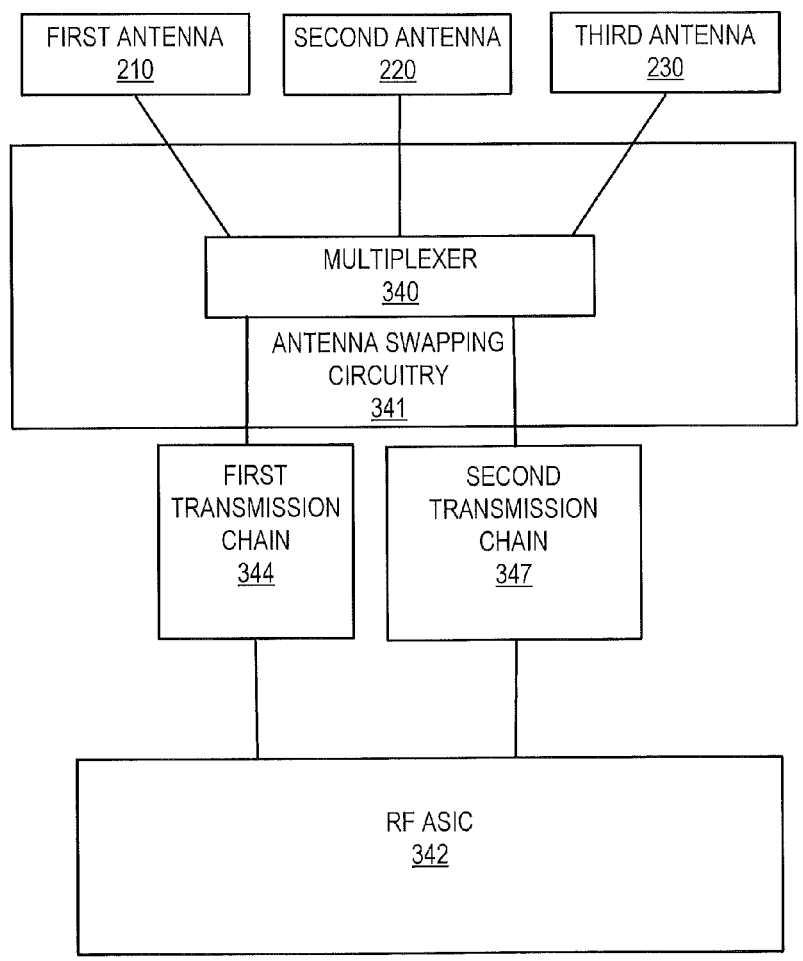

Referring now to FIGS. 3A and 3B, block diagrams are provided illustrating a wireless electronic device 100, according to various embodiments of the present inventive concepts. As illustrated in FIG. 3A, a wireless electronic device 100 may include a multi-band antenna system 346, antenna swapping circuitry 341, a Radio Frequency (RF) Application Specific Integrated Circuit (ASIC) (including, e.g., a transceiver) 342, and a processor 351. The wireless electronic device 100 may further include a display 354, keypad 352, speaker 356, memory 353, microphone 350, and/or camera 358. The antenna swapping circuitry 341 is connected between the multi-band antenna system 346 and the RF ASIC 342 of the wireless electronic device 100 such that it can provide swapping between different antennas in the multi-band antenna system 346 for active use (e.g., for transmitting and/or receiving communications). For example, different antennas in the multi-band antenna system 346 may communicate with a network 380 (e.g., the network 110 illustrated in FIG. 1). The network 380 may include a transmitter/receiver (TX/RX) 383 (e.g., which may be included as a part of the base station 130a illustrated in FIG. 1). The network 380 may further include a scheduler 385, which may be configured to schedule the timing of events/actions of the wireless electronic device 100 and/or the network 380.

The RF ASIC 342 may include transmit/receive circuitry (TX/RX) that provides separate communication paths for supplying/receiving RF signals to different radiating elements of the multi-band antenna system 346 via their respective RF feeds. Accordingly, when the multi-band antenna system 346 includes two active antenna elements (e.g., the antennas 210, 220), the RF ASIC 342 may include two transmit/receive circuits 343, 345 connected to different ones of the antenna elements via the respective RF feeds.

The RF ASIC 342, in operational cooperation with the processor 351, may be configured to communicate according to at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), 4G, Time Division LTE (TD LTE), Universal Mobile Telecommunications System (UMTS), Global Standard for Mobile (GSM) communication, General Packet Radio Service (GPRS), enhanced data rates for GSM evolution (EDGE), DCS, PDC, PCS, Code Division Multiple Access (CDMA), wideband-CDMA, and/or CDMA2000. The radio access technology may operate using such frequency bands as 700-800 Megahertz (MHz), 824-894 MHz, 880-960 MHz, 1710-1880 MHz, 1820-1990 MHz, 1920-2170 MHz, 2300-2400 MHz, and 2500-2700 MHz. Other radio access technologies and/or frequency bands can also be used in embodiments according to the inventive concepts. Various embodiments may provide coverage for non-cellular frequency bands such as Global Positioning System (GPS), Wireless Local Area Network (WLAN), and/or Bluetooth frequency bands. As an example, in various embodiments according to the inventive concepts, the local wireless network 170 (illustrated in FIG. 1) is a WLAN compliant network. In various other embodiments according to the inventive concepts, the local wireless network 170 is a Bluetooth compliant interface.

A transmitter portion of a transceiver of the RF ASIC 342 converts information, which is to be transmitted by the wireless electronic device 100, into electromagnetic signals suitable for radio communications. A receiver portion of the transceiver of the RF ASIC 342 demodulates electromagnetic signals, which are received by the wireless electronic device 100 from the network 110 (illustrated in FIG. 1) to provide the information contained in the signals in a format understandable to a user of the wireless electronic device 100.

The wireless electronic device 100 is not limited to any particular combination/arrangement of the keypad 352 and the display 354. As an example, it will be understood that the functions of the keypad 352 and the display 354 can be provided by a touch screen through which the user can view information, such as computer displayable documents, provide input thereto, and otherwise control the wireless electronic device 100. Additionally or alternatively, the wireless electronic device 100 may include a separate keypad 352 and display 354.

Referring still to FIG. 3A, the memory 353 can store computer program instructions that, when executed by the processor circuit 351, carry out the operations described herein and shown in the figures. As an example, the memory 353 can be non-volatile memory, such as EEPROM (flash memory), that retains the stored data while power is removed from the memory 353.

Referring now to FIG. 3B, a block diagram is provided for the antenna swapping circuitry 341 of the wireless electronic device 100. According to various embodiments, the antenna swapping circuitry 341 of the wireless electronic device 100 may include an antenna switch (e.g., a multiplexer 340). The multiplexer 340 may be connected to a plurality of transmission chains (e.g., first and second transmission chains 344 and 347, respectively) of the wireless electronic device 100, such that the multiplexer 340 connects one of the first, second, and third antennas 210, 220, and 230 to the first transmission chain 344, and the other one of the first, second, and third antennas 210, 220, 230 to the second transmission chain 347. Moreover, it will be understood that one or more of the first, second, and third antennas 210, 220, 230 could include a plurality of antennas. As an example, the first antenna 210 could include two or more antennas that are connected to the second transmission chain 347 for transmission to the network 380.

Figure 4:
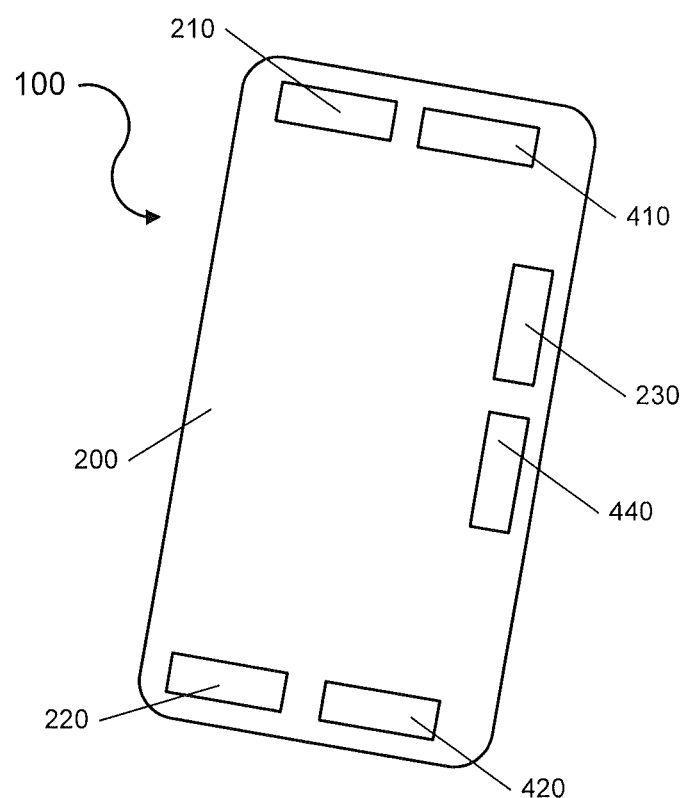
FIG. 4 illustrates a wireless electronic device including several possible antenna combinations, according to various embodiments of the present inventive concepts.

Referring now to FIG. 4, a wireless electronic device 100 including several possible antenna combinations is illustrated, according to various embodiments of the present inventive concepts. In particular, FIG. 4 illustrates fourth and fifth antennas 410, 420, in addition to the first, second, and third antennas 210, 220, and 230. Moreover, FIG. 4 illustrates that one or more antennas (e.g., side antenna 440, which may be a notch/slot antenna, among other configurations) may be located at a side portion (as opposed to a top or bottom portion) of the wireless electronic device 100. Furthermore, although six (6) antennas are illustrated in FIG. 4, it will be understood that the fourth and/or fifth antennas 410, 420 may be located at a side portion of the wireless electronic device 100 rather than the side antenna 440, or may be eliminated altogether. In other words, the wireless electronic device 100 may include three (3) or more antennas, each of which may be located anywhere along the periphery of the wireless electronic device 100.

Each of the antennas 210, 220, 230, 410, 420, and 440 may be multi-band antennas. Additionally, the antennas 210, 220, 230, 410, 420, and 440 may be ones of various antennas configured for wireless communications. For example, each of the antennas 210, 220, 230, 410, 420, and 440 may be a monopole antenna or a planar inverted-F antenna (PIFA), among others. Additionally, each of the antennas 210, 220, 230, 410, 420, and 440 may be a multi-band antenna and/or may be configured to communicate cellular and/or non-cellular frequencies. Moreover, each of the antennas 210, 220, 230, 410, 420, and 440 may be a multi-band antenna included within the multi-band antenna system 346 illustrated in FIG. 3A. Furthermore, according to various embodiments, each of the antennas 210, 220, 230, 410, 420, and 440 may be designed to cover all frequency bands of interest to the wireless electronic device 100, and each may be configured to transmit at full power and/or reduced power levels.

Moreover, it will be understood by those skilled in the art that a controller (e.g., the processor 351 and/or another controller) may be configured to control the components of the wireless electronic device 100. In particular, the controller may be configured to control transmissions of signals (including power levels thereof) to the network 380, as well as the reception and processing of signals received from the network 380. For example, the controller may be configured to command the multiplexer 340 to select (e.g., to swap to) the second and third antennas 220, 230 as a group of antennas for active transmission and/or reception of signals with respect to the network 380. It will be further understood that the controller may also be configured to control the swapping from one antenna (or group of antennas) to another antenna (or group of antennas) by connecting the new antenna (or group of antennas) to a transmission chain and disconnecting the previous antenna (or group of antennas) from the transmission chain, at a time period indicated by the network 380. Moreover, the controller may be configured to command the multiplexer 340 to switch which antennas (or groups of antennas) are connected to different ones of a plurality of transmission chains (e.g., the first and second transmission chains 344, 347).

As another example, the controller of the wireless electronic device 100 may use an antenna swapping algorithm to provide commands to the multiplexer 340. The antenna swapping algorithm may be controlled/performed by at least one of the RF ASIC 342, the processor 351, and another processor/ASIC. Additionally, the antenna swapping algorithm may be stored in the memory 353, the RF ASIC 342, and/or another non-transitory storage medium within the wireless electronic device 100. For example, the RF ASIC 342 may provide signal quality measurement values for antennas in the multi-band antenna system 346 to the antenna swapping algorithm, which may then provide an output that commands the multiplexer 340 to select a particular group of antennas for active transmission and/or reception of signals with respect to the network 380.

Accordingly, the antenna swapping algorithm may determine that one of the first and second antennas 210, 220 (or any combination/pair of the antennas illustrated in FIG. 4) has a better/stronger signal quality measurement, and may thus command the multiplexer 340 to swap the antennas to use the better/stronger antenna (or combination/pair of antennas). Moreover, it will be understood that the antenna swapping algorithm may save/access the signal quality measurement of the antenna configuration that was used by the wireless electronic device 100 before the swapping.

Referring now to FIGS. 5A-5F, flowcharts are provided illustrating antenna swapping operations, according to various embodiments of the present inventive concepts.

Figure 5A:
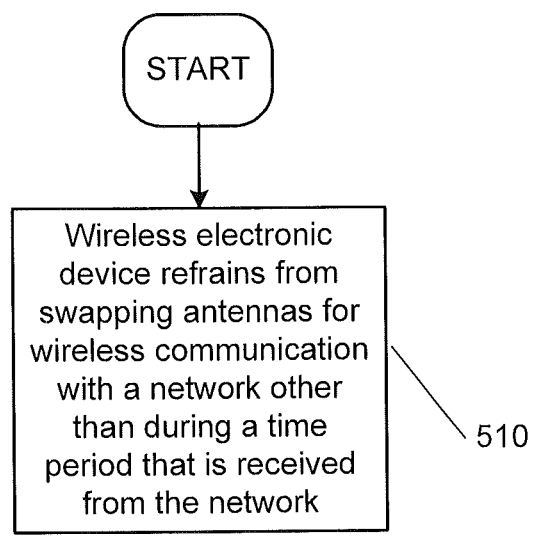
FIGS. 5A-5F are flowcharts illustrating antenna swapping operations, according to various embodiments of the present inventive concepts.

Referring to FIG. 5A, the operations include using control circuitry (e.g., the processor 351 and/or other control circuitry in the wireless electronic device 100) and the antenna swapping circuitry 341 to refrain from swapping antennas (e.g., antennas in the multi-band antenna system 346) for wireless communication with the network 380 other than during a time period that is received from (e.g., indicated by) the network 380 (Block 510). In other words, the wireless electronic device 100 may perform closed loop antenna swapping based on timing that is controlled by the network 380.

Figure 5B:
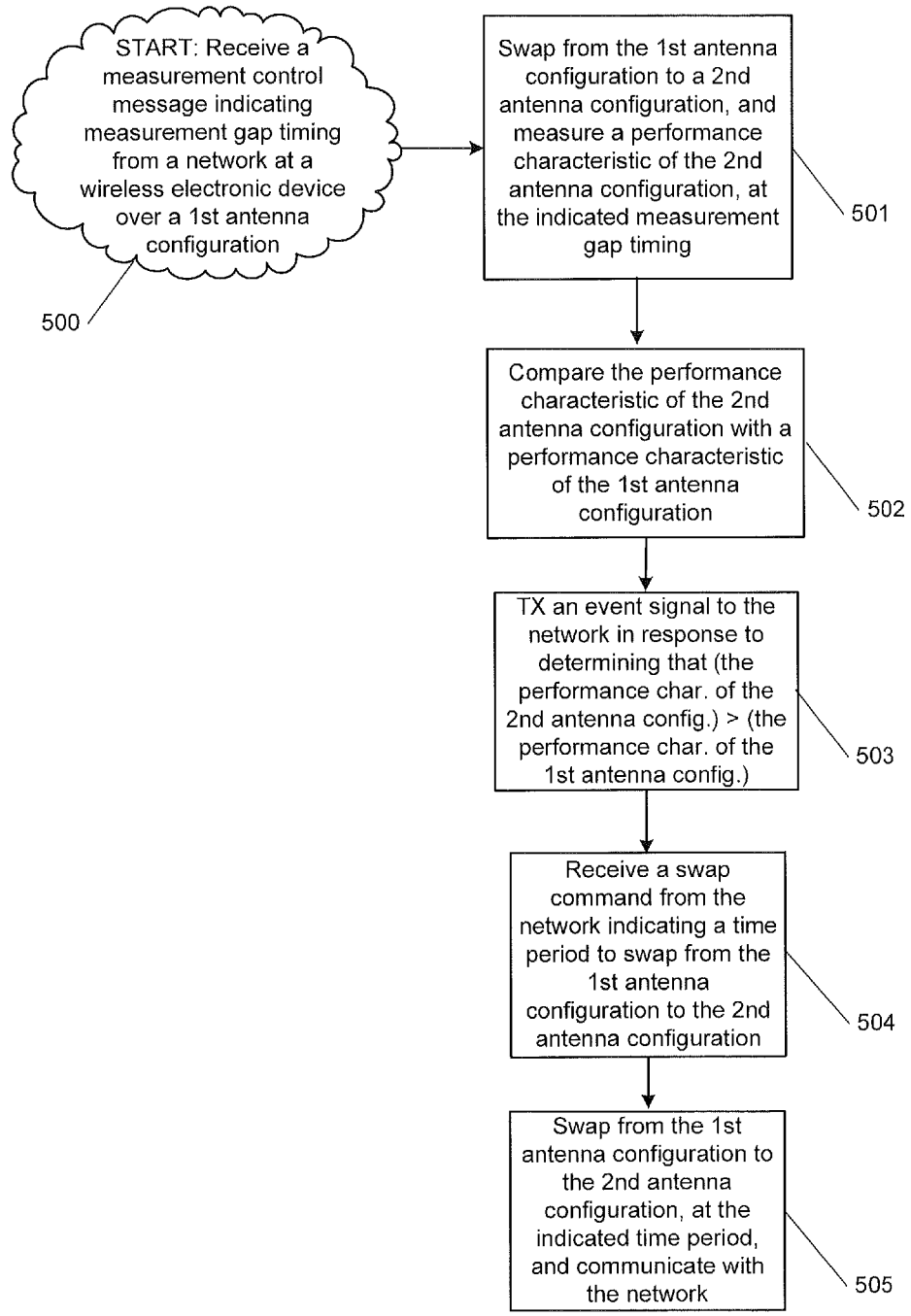

Referring to FIG. 5B, the operations include receiving a measurement control message indicating measurement gap timing from the network 380 at the wireless electronic device 100 over a first antenna configuration (Block 500). For example, the measurement gap timing may indicate one or more time slots during which the network 380 will not expect the wireless electronic device 100 to listen to communications from the network 380. Accordingly, the measurement gap timing may allow the wireless electronic device 100 to check for another, better antenna configuration than the first antenna configuration. In particular, the operations may further include swapping from the first antenna configuration to a second antenna configuration, and measuring a performance characteristic of the second antenna configuration, at the indicated measurement gap timing (Block 501). As an example, the wireless electronic device 100 may swap from the first antenna configuration to the second antenna configuration, and measure the performance characteristic of the second antenna configuration, during at least a portion of one or more time slots indicated by the indicated measurement gap timing.

Moreover, it will be understood that the first and second antenna configurations may each include a single antenna or a plurality of antennas. For example, the first antenna configuration may include the first antenna 210 and the second antenna 220, and the second antenna configuration may include the third antenna 230 and the fourth antenna 410. Alternatively, the first antenna configuration may include only the second antenna 220, and the second antenna configuration may include only the first antenna 210. Furthermore, in various embodiments, the first and second antenna configurations may include at least one common antenna (i.e., at least one antenna that is present in both configurations). As an example, the first antenna configuration may include the first antenna 210 and the second antenna 220, and the second antenna configuration may include the first antenna 210 and the third antenna 230. Additionally, according to some embodiments, the number of active antennas will remain constant before and after each swap. In other words, the number of antennas that are actively transmitting and/or receiving communications for the wireless electronic device 100 when using the first antenna configuration may be the same as the number of antennas that are actively transmitting and/or receiving communications for the wireless electronic device 100 when using (i.e., after selection of) the second antenna configuration.

After measuring the performance characteristic of the second antenna configuration at the indicated measurement gap timing, the wireless electronic device 100 may compare the performance characteristic of the second antenna configuration with a performance characteristic of the first antenna configuration (Block 502). The performance characteristics may each be one of such parameters as received signal strength, antenna input impedance, received signal-to-noise ratio (SNR), or other quality measurements (e.g., other signal quality properties or radio channel propagation properties). As will be understood by those skilled in the art, these parameters may be sensed by various sensors in the wireless electronic device 100. Furthermore, the wireless electronic device 100 may measure and save (e.g., in the memory 353 or the RF ASIC 342) the performance characteristic of the first antenna configuration before swapping antenna configurations and measuring the performance characteristic of the second antenna configuration in Block 501.

After comparing the performance characteristics in Block 502, the wireless electronic device 100 may transmit an event signal to the network 380 in response to determining that the performance characteristic of the second antenna configuration exceeds (e.g., is stronger than) the performance characteristic of the first antenna configuration (Block 503). After receiving the event signal from the wireless electronic device 100, the network 380 may transmit (and the wireless electronic device 100 may receive) a swap command indicating a time period to swap from the first antenna configuration to the second antenna configuration (Block 504). For example, the time period may indicate a start time and/or a stop time for the wireless electronic device 100 to swap from the first antenna configuration to the second antenna configuration. Additionally or alternatively, the time period may indicate a time slot (e.g., a time frame) during at least a portion of which the wireless electronic device 100 may swap from the first antenna configuration to the second antenna configuration. The time slot may be defined by the network 380's scheduler 385.

Referring still to FIG. 5B, the wireless electronic device 100 may swap from the first antenna configuration to the second antenna configuration at the indicated time period, and may communicate with the network 380 over the second antenna configuration (Block 505). Additionally, the wireless electronic device 100 may temporarily reduce its transmission output power during the antenna swapping in Block 505 to reduce damage to the antenna swapping circuitry 341. Moreover, the antenna swapping in Block 505 and/or the temporary reduction in transmission output power may be performed during an ongoing voice/data communication between the wireless electronic device 100 and the network 380.

Figure 5C:
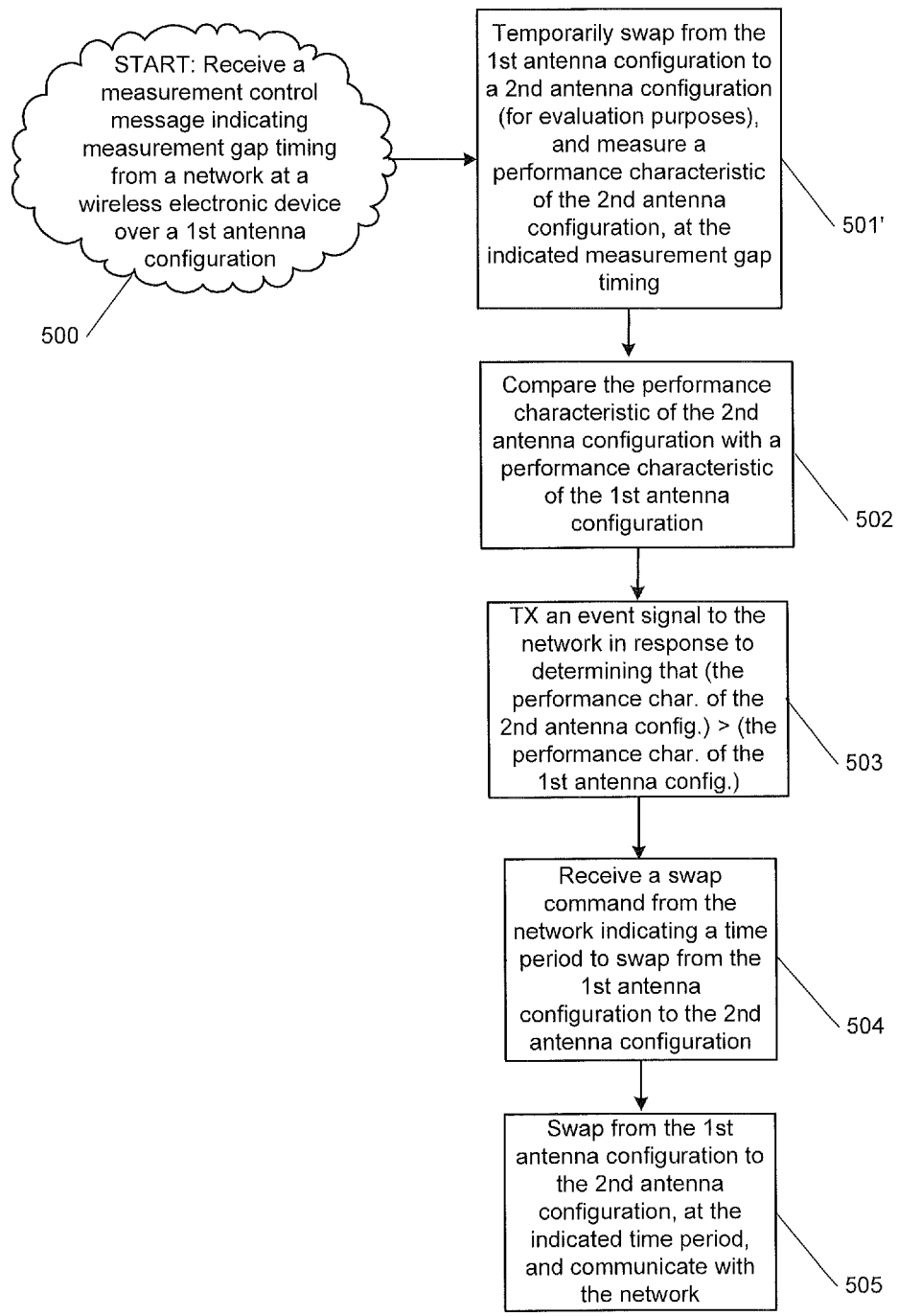

Referring to FIG. 5C, the operations include Blocks 500 and 502-505 of FIG. 5B and further include Block 501', which is a modification of FIG. 5B's Block 501. In particular, Block 501' of FIG. 5C clarifies that the swap at the indicated measurement gap timing is a temporary swap that is for evaluation purposes. In contrast, the communication illustrated after the swap in Block 505 at the indicated time period may include voice/data communication. In other words, the wireless electronic device 100 may begin transmitting and/or receiving voice/data signals over the second antenna configuration after the swap in Block 505. Additionally, the temporary swap in Block 501' at the indicated measurement gap timing may be more temporary than the swap at the indicated time period in Block 505. As an example, the temporary swap to the second antenna configuration in Block 501' may last for only one (or a few) time slots, whereas the use of the second antenna configuration after the swap at the indicated time period in Block 505 may be indefinite until the wireless electronic device 100 receives another swap command from the network 380.

Figure 5D:
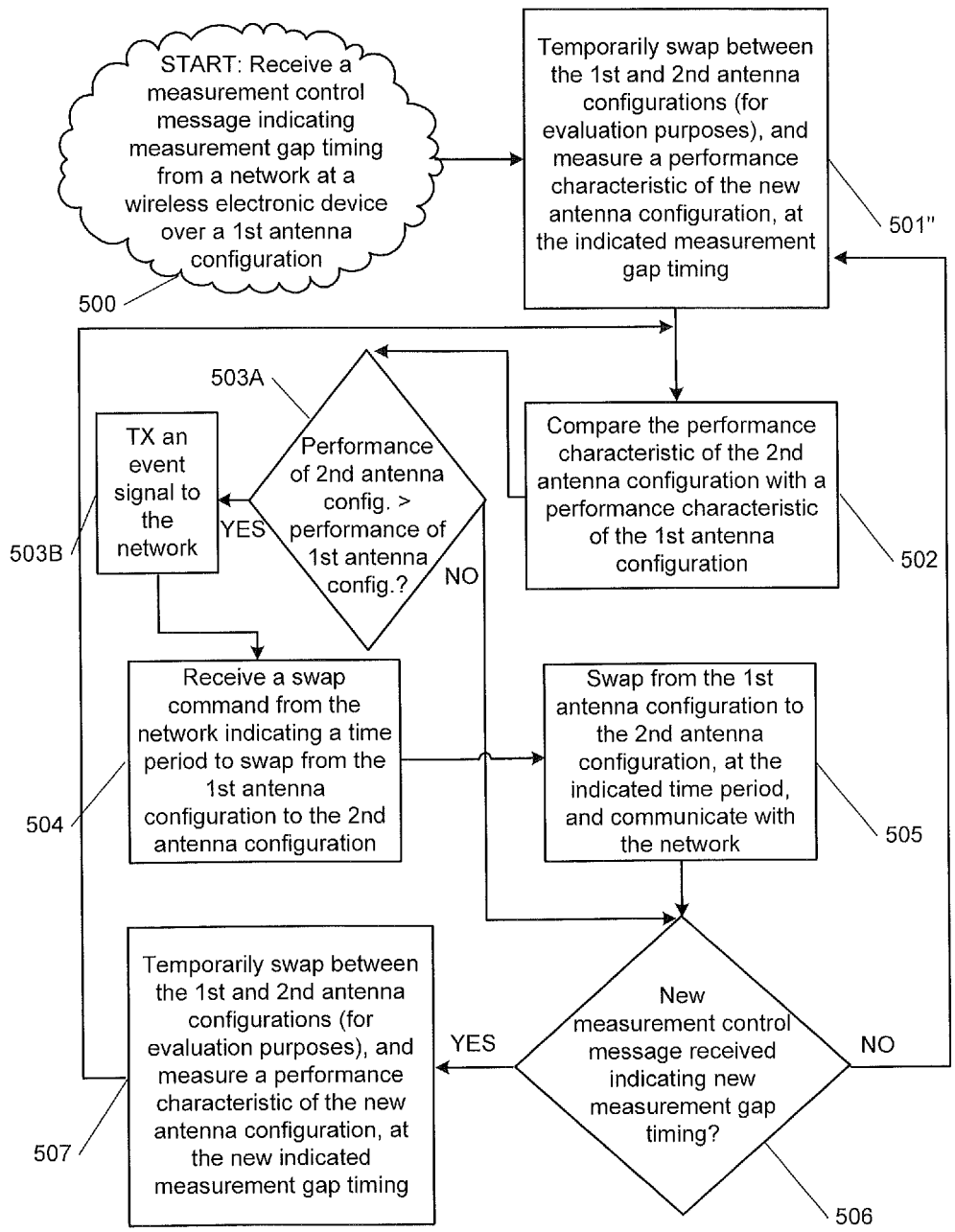

Referring to FIG. 5D, the operations include Blocks 500, 502, 504, and 505 of FIG. 5C. The operations further include Block 501", which is a modification of FIG. 5C's Block 501', Blocks 503A and 503B, which are modifications of FIG. 5C's Block 503, and Blocks 506 and 507. In particular, Blocks 503A and 503B divide Block 503 into a decision block (Block 503A) and a signal transmission block (Block 503B). Specifically, Block 503A illustrates a decision block regarding whether the performance characteristic of the second antenna configuration exceeds the performance characteristic of the first antenna configuration. If so (i.e., if the answer is "YES"), then the wireless electronic device 100 transmits an event signal to the network 380 (Block 503B). Alternatively, if the answer to Block 503A is "NO," then the wireless electronic device 100 determines whether a new measurement control message has been received indicating new measurement gap timing (Block 506). In other words, the wireless electronic device 100 determines whether the network 380 (e.g., via the scheduler 385) has changed the time(s) when the wireless electronic device 100 can make antenna performance measurements. FIG. 5D further illustrates that the wireless electronic device 100 will also determine whether a new measurement control message has been received indicating new measurement gap timing (Block 506) after swapping antenna configurations at the indicated time period in Block 505.

If the answer to Block 506 is "NO," then the wireless electronic device 100 performs a temporary swap between the first and second antenna configurations, and measures a performance characteristic of the new antenna configuration (i.e., the antenna configuration that has been swapped to), at the previously-indicated measurement gap timing (Block 501"). For example, if the wireless electronic device 100 has swapped to the second antenna configuration in Block 505, then the subsequent temporary swap in Block 501" will be from the second antenna configuration to the first antenna configuration. Moreover, it will be understood that if the wireless electronic device 100 temporarily swaps to the first antenna configuration in Block 501", then Block 503A will be modified such that the wireless electronic device 100 will determine whether the performance characteristic of the first antenna configuration is greater than the performance characteristic of the second antenna configuration. Similarly, Blocks 504 and 505 will be modified to facilitate swapping to the first antenna configuration from the second antenna configuration. Alternatively, if the wireless electronic device 100 has not swapped to the second antenna configuration in Block 505 because the performance of the second antenna configuration does not exceed the performance of the first antenna configuration (Block 503A), and if the new measurement control message is not received (Block 506), then the subsequent temporary swap in Block 501" will be from the first antenna configuration to the second antenna configuration.

In contrast with temporarily swapping at the previously-indicated measurement gap timing illustrated in Block 501", the wireless electronic device 100 may temporarily swap between the first and second antenna configurations, for antenna evaluation purposes, and a measure a performance characteristic of the newly-selected (e.g., temporarily-swapped-to) one of the first and second antenna configurations, at the new indicated measurement gap timing (Block 507), if the answer to Block 506 is "YES." Additionally, FIG. 5D illustrates that the output of Block 507 feeds back to Block 502.

Figure 5E:
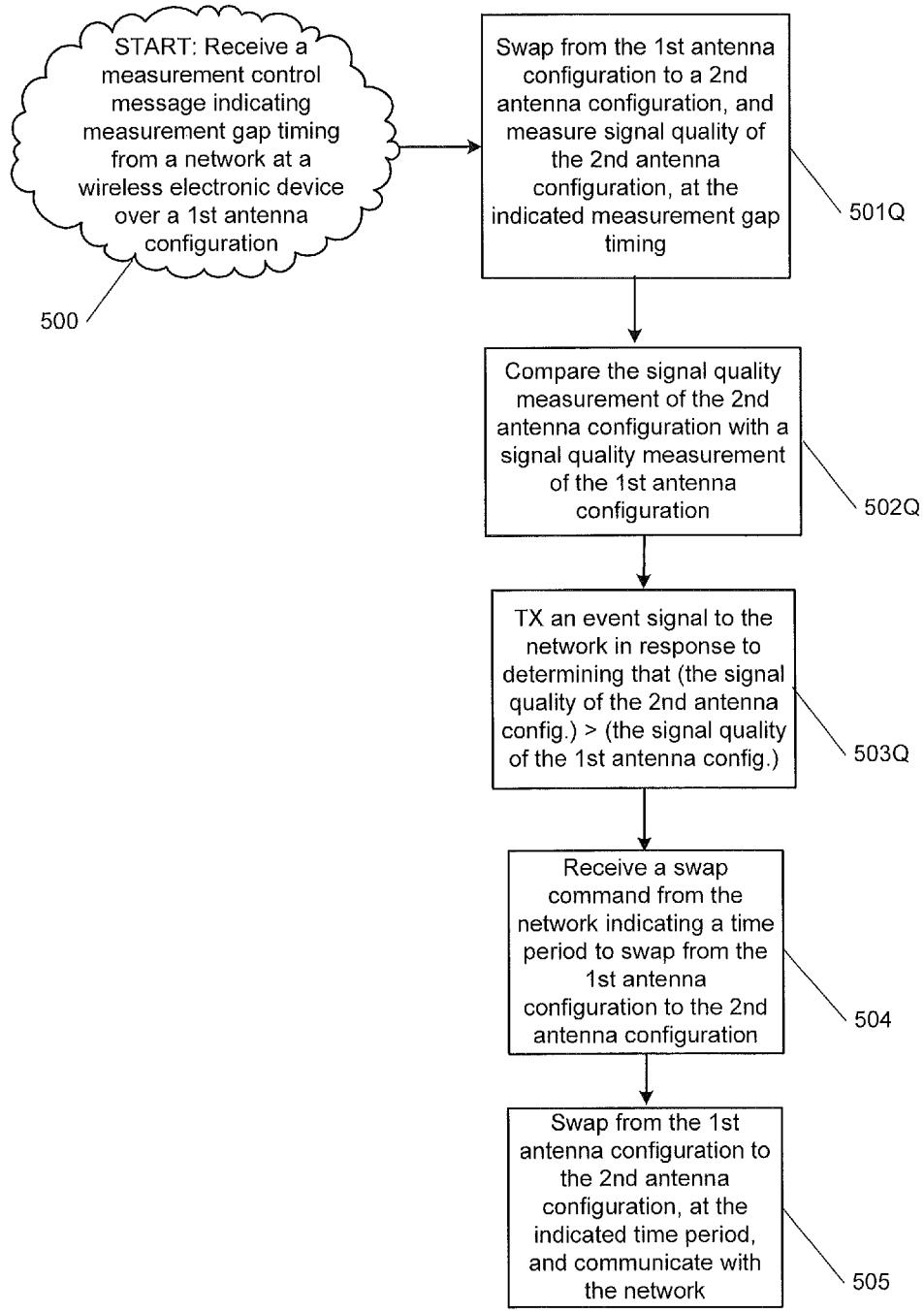

Referring to FIG. 5E, the operations include Blocks 500, 504, and 505 of FIG. 5C and further include Blocks 501Q, 502Q, and 503Q, which are modifications of FIG. 5C's Blocks 501', 502, and 503, respectively. In particular, Block 501Q of FIG. 5E clarifies that measuring a performance characteristic may include measuring signal quality of the second antenna configuration, and Block 502Q of FIG. 5E clarifies comparing a signal quality measurement of the first antenna configuration with a signal quality measurement of the second antenna configuration. Additionally, Block 503Q of FIG. 5E clarifies that the wireless electronic device 100 may transmit an event signal to the network 380 in response to determining that the signal quality of the second antenna configuration exceeds the signal quality of the first antenna configuration.

Figure 5F:
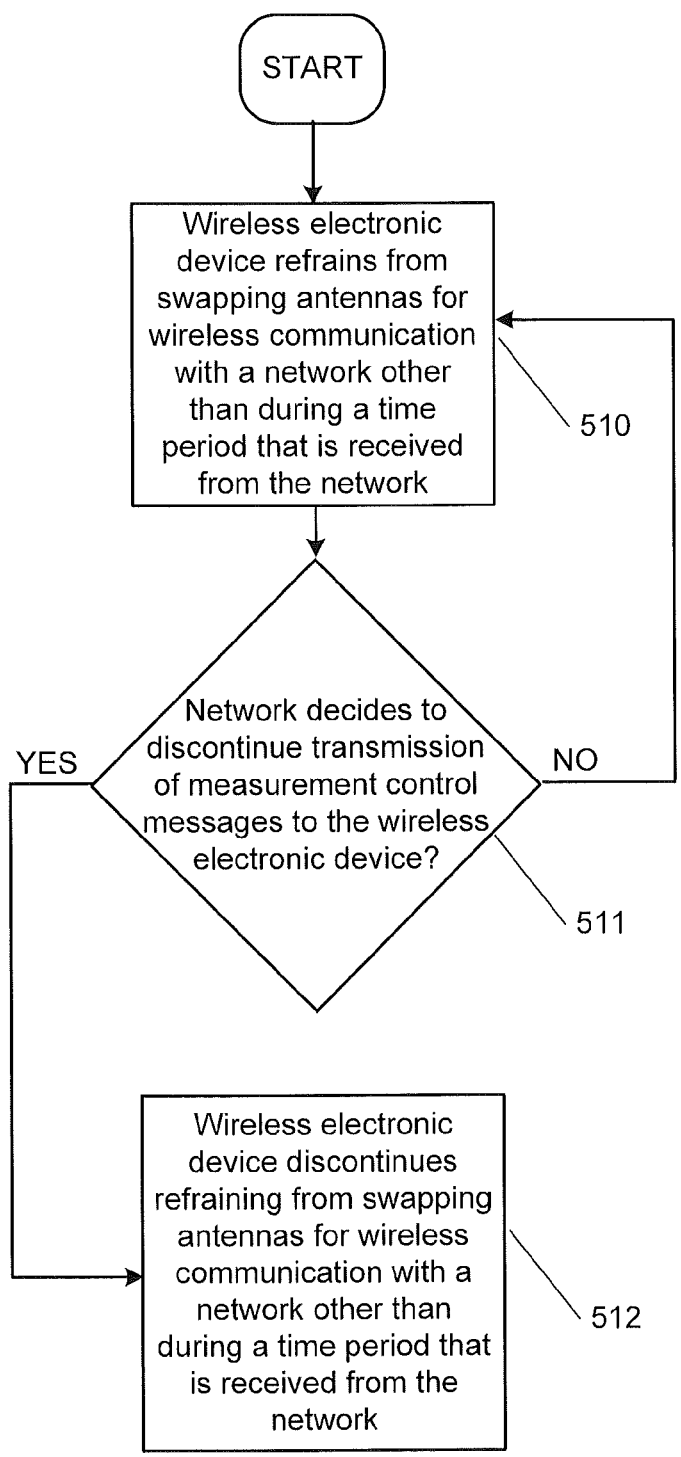

Referring to FIG. 5F, the operations include Block 510 of FIG. 5A and further include Blocks 511 and 512. Block 511 illustrates that the network 380 may decide to discontinue transmission of measurement control messages to the wireless electronic device 100. If the network 380 decides to discontinue such transmission of the measurement control messages ("YES" in Block 511), then the wireless electronic device 100 will discontinue refraining from swapping antennas for wireless communication with the network 380 other than during a time period that is received from the network 380 (Block 512). In other words, the network 380 may decide to disallow closed loop antenna swapping with respect to the network 380 and the wireless electronic device 100. Alternatively, if the network 380 does not decide to discontinue transmission of the measurement control messages ("NO" in Block 511) (i.e., does not decide to disallow the closed loop antenna swapping), then the wireless electronic device 100 will continue refraining from swapping antennas for wireless communication with the network 380 other than during a time period that is received from the network 380 (Block 510).

Figure 6:
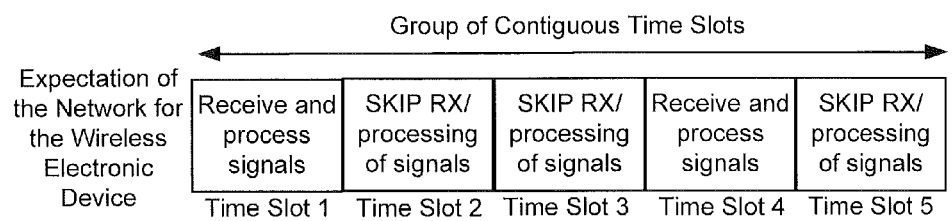
FIG. 6 is a diagram illustrating expectations of a network for a wireless electronic device during a group of contiguous time slots, according to various embodiments of the present inventive concepts.

Referring now to FIG. 6, a diagram is provided illustrating expectations of the network 380 for the wireless electronic device 100 during a group of contiguous time slots, according to various embodiments of the present inventive concepts. For example, the indicated measurement gap timing described in FIG. 5B's Block 501 may be represented by one or more of the time slots in FIG. 6. As an example, the indicated measurement gap timing may include one or more of FIG. 6's time slots 2, 3, and 5, during which the network 380 expects the wireless electronic device 100 to skip receiving and/or processing of signals from the network 380. Accordingly, the wireless electronic device 100 may evaluate different antenna configurations for its transmission chains using network-defined time slots. Additionally, the indicated time period at which the wireless electronic device 100 swaps between the first and second antenna configurations to communicate with the network 380 (see, e.g., FIG. 5B's Block 505) may be a time slot similar to the time slots 1-5 in FIG. 6 and/or may include an indication of a start time and/or a stop time for the swap.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. An antenna swapping method for a wireless electronic device, comprising:
  receiving a measurement control message indicating measurement gap timing from a network at the wireless electronic device over a first antenna configuration;
  swapping from the first antenna configuration to a second antenna configuration, and measuring a performance characteristic of the second antenna configuration, at the indicated measurement gap timing;
comparing the performance characteristic of the second antenna configuration with a performance characteristic of the first antenna configuration;
transmitting an event signal from the wireless electronic device to the network in response to determining that the performance characteristic of the second antenna configuration exceeds the performance characteristic of the first antenna configuration;
after transmitting the event signal, receiving a swap command from the network at the wireless electronic device indicating a time period for the wireless electronic device to swap from the first antenna configuration to the second antenna configuration; and
swapping from the first antenna configuration to the second antenna configuration, at the indicated time period, and communicating with the network over the second antenna configuration.

2. The method of claim 1, wherein the swapping at the indicated measurement gap timing comprises a swap for antenna evaluation purposes that is more temporary than the swapping at the indicated time period.

3. The method of claim 2, further comprising:
after either swapping from the first antenna configuration to the second antenna configuration at the indicated time period or determining that the performance characteristic of the second antenna configuration does not exceed the performance characteristic of the first antenna configuration, determining whether a new measurement control message indicating new measurement gap timing has been received from the network at the wireless electronic device.

4. The method of claim 3, further comprising:
in response to determining that the new measurement control message has been received, swapping between the first and second antenna configurations, and measuring the performance characteristic of one of the first and second antenna configurations, at the new indicated measurement gap timing.

5. The method of claim 3, further comprising:
in response to determining that the new measurement control message has not been received, swapping between the first and second antenna configurations, and measuring the performance characteristic of one of the first and second antenna configurations, at the measurement gap timing indicated by the previously-received measurement control message.

6. The method of claim 1, wherein the indicated measurement gap timing indicates one or more time slots during which the network will not expect the wireless electronic device to receive and process transmissions from the network.

7. The method of claim 1, wherein comparing the performance characteristics of the first and second antenna configurations, respectively, comprises comparing a signal quality measurement of the first antenna configuration with a signal quality measurement of the second antenna configuration.

8. The method of claim 1, wherein swapping from the first antenna configuration to the second antenna configuration comprises swapping from a first group of antennas to a second group of antennas, and wherein the number of active antennas among all groups of antennas remains constant before and after the swapping.

9. The method of claim 1, further comprising disallowing closed-loop antenna swapping by discontinuing receipt of measurement control messages from the network at the wireless electronic device.

10. A wireless electronic device, comprising:
first and second antennas connected to a multi-band transceiver circuit configured to provide communications for the wireless electronic device; and
a controller configured to:
receive a measurement control message indicating measurement gap timing from a network;
control swapping from the first antenna to the second antenna by connecting the second antenna to a transmission chain of the wireless electronic device and disconnecting the first antenna from the transmission chain, and measure a performance characteristic of the second antenna, at the indicated measurement gap timing;
compare the performance characteristic of the second antenna with a performance characteristic of the first antenna;
transmit an event signal to the network indicating that the second antenna provides a better antenna configuration than the first antenna, in response to determining that the performance characteristic of the second antenna exceeds the performance characteristic of the first antenna;
after transmitting the event signal, receive a swap command from the network indicating a time period to swap from the first antenna to the second antenna;
control swapping from the first antenna to the second antenna by connecting the second antenna to the transmission chain and disconnecting the first antenna from the transmission chain, at the indicated time period; and
control communication between the second antenna and the network after the indicated time period.

11. The wireless electronic device of claim 10, wherein:
the transmission chain comprises one among a plurality of transmission chains of the wireless electronic device;
the first and second antennas comprise first and second antennas among a plurality of antennas of the wireless electronic device;
the wireless electronic device further comprises a switch that connects the plurality of transmission chains and the plurality of antennas; and
a quantity of the plurality of antennas is greater than a quantity of the plurality of transmission chains.

12. The wireless electronic device of claim 11, wherein the controller is configured to command the switch to switch which ones of the plurality of antennas are connected to ones of the plurality of transmission chains.

13. The wireless electronic device of claim 12, wherein:
the wireless electronic device comprises a non-transitory storage medium that stores an antenna swapping algorithm;
the controller is configured to control input of the performance characteristics of the first and second antennas, respectively, into the antenna swapping algorithm; and
the controller is further configured to control transmission of an output of the antenna swapping algorithm to the network as the event signal, in response to the antenna swapping algorithm determining that the performance characteristic of the second antenna exceeds the performance characteristic of the first antenna.

14. The wireless electronic device of claim 13, wherein:
the controller is further configured to determine whether a new measurement control message indicating new measurement gap timing has been received from the network at the wireless electronic device, after the antenna swapping algorithm either determines that the performance characteristic of the second antenna exceeds the performance characteristic of the first antenna or determines that the performance characteristic of the second antenna does not exceed the performance characteristic of the first antenna; and the swapping at the indicated measurement gap timing comprises a swap for antenna evaluation purposes that is more temporary than the swapping at the indicated time period.

15. The wireless electronic device of claim 14, wherein the controller is further configured to control swapping between the first and second antennas, and measuring the performance characteristic one of the first and second antennas, at the new indicated measurement gap timing, in response to determining that the new measurement control message has been received.

16. The wireless electronic device of claim 14, wherein the controller is further configured to control swapping between the first and second antennas, and measuring the performance characteristic of one of the first and second antennas, at the measurement gap timing indicated by the previously-received measurement control message, in response to determining that the new measurement control message has not been received.

17. The wireless electronic device of claim 10, wherein the controller is further configured to temporarily reduce transmission output power during the swapping at the indicated time period.

18. The wireless electronic device of claim 10, wherein swapping from the first antenna to the second antenna comprises swapping from a first group of antennas to a second group of antennas.

* * * * *